I. A. MANN, DEC'D.
M. P. MANN, EXECUTRIX.
PIPE JOINT.
APPLICATION FILED DEC. 21, 1917.

1,309,146.

Patented July 8, 1919.
2 SHEETS—SHEET 1.

WITNESS

INVENTOR.

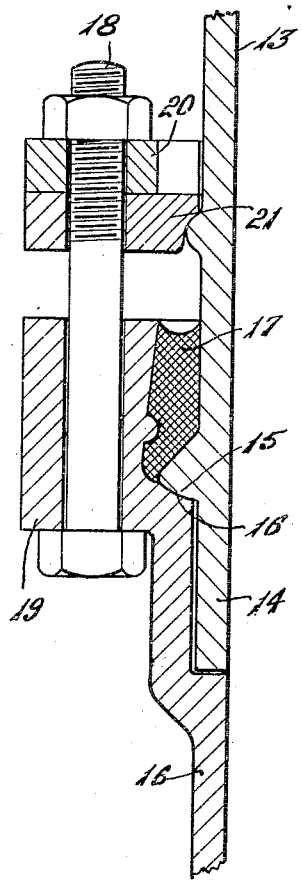

UNITED STATES PATENT OFFICE.

IRA A. MANN, DECEASED, LATE OF PITTSBURGH, PENNSYLVANIA, BY MARION P. MANN, EXECUTRIX, OF PITTSBURGH, PENNSYLVANIA.

PIPE-JOINT.

1,309,146.   Specification of Letters Patent.   Patented July 8, 1919.

Application filed December 21, 1917. Serial No. 208,310.

*To all whom it may concern:*

Be it known that IRA A. MANN, late a citizen of the United States, residing at Pittsburgh, in the county of Allegheny and State of Pennsylvania, invented certain new and useful Improvements in Pipe-Joints, of which the following is a specification.

The invention relates to pipe joints or connections, and has for its principal objects the provision of an improved connection wherein, (1) the connection is made doubly secure against leakage, (2) the joint is kept tight regardless of the expansion and contraction of the pipes due to changes in temperature, and (3) a tight joint is insured even though the pipe should sag or be bent laterally at the connection. Certain embodiments of the invention are illustrated in the accompanying drawings, wherein—

Figure 2:
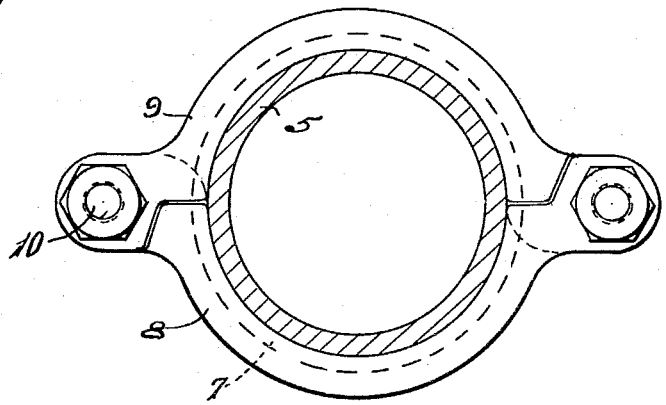
Figure 1:
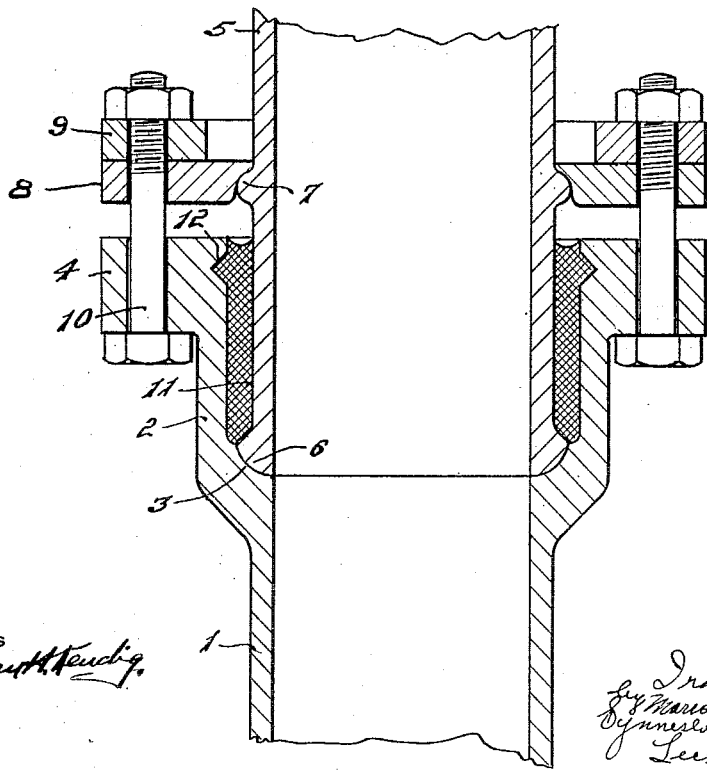

Figure 1 is a section through a pipe joint embodying the invention; Fig. 2 is a section taken through the pipe end above the clamping or securing ring; and Fig. 3 is a partial section through pipe joint involving a modification of the invention.

In the construction of Fig. 1, the pipe 1 is provided with a hub 2 having a recess with a curved ground surface 3 at the inner end thereof, the term "ground" being used in its broad sense to designate a surface which is smoothed or finished to such an extent as to make a tight joint when engaged by a similar opposing surface. The hub is also provided with a plurality of perforated securing lugs 4.

The pipe end 5 fits into the recess in the hub and is provided with a curved ground surface 6 opposing the surface 3 and adapted to make a tight joint when the two surfaces are brought into relatively tight engagement, such pipe also being provided with a ridge 7 for engagement with the clamping or securing ring. Such ring consists of a pair of members 8 and 9 hinged upon the bolts 10 so that the ring may be readily applied to or removed from the pipe.

The tightening of the bolts brings the surfaces 3 and 6 into tight engagement so as to prevent any leakage, and the tightness of the joint is made doubly secure by the use of the metallic packing 11 which is placed in position in the usual way. The inner face of the recess is also preferably provided with a groove 12 into which the packing fits, thus making it more secure against removal.

The joint as thus constructed is very secure due to the two means for securing the tight joint, either of which is normally sufficient for the purpose. The parts are held securely together regardless of any expansion or contraction of the pipes due to changes in temperature. Even though the metallic packing should be loosened and worked out of position the ground surfaces will keep the joint tight and the curvature of such surfaces permits a maintenance of the joint in tight condition even when the pipe sags or buckles, as sometimes happens when the pipe is used in a horizontal position. Other advantages incident to the construction will be apparent to those skilled in the art.

In the construction shown in Fig. 3 the pipe end 13 is provided with an extension 14 in advance of the ground surface 15, the hub 16 having a recess of two diameters, the upper of which carries the metallic packing 17 and the lower of which receives the extension 14. The parts are secured together as in the other construction, the bolt 18 extending through a lug 19 on the hub and other securing ring members 20 and 21 upon the pipe end 13. The hub is provided with a ground surface at 16 for engagement with the surface 15.

It is apparent that the invention is capable of still other modifications and embodiments.

The lead packing above the ground joints in Figs. 1 and 3 serves to give additional security to the joint, but in most cases the ground joint is sufficient and it is only necessary to add the lead packing in case the joint springs a leak.

What is claimed is:

1. In combination in a pipe connection, a hub and pipe end in telescopic relation and having opposing rounded ground surfaces adapted to make a tight joint when brought together, said hub provided with a packing recess to the rear of said surfaces adapted to receive a packing, and said pipe end formed with an annular ridge rounded in cross-section and positioned rearwardly of said recess, and means for maintaining the telescopic relation of the parts and for drawing said surfaces into tight engagement, whether the connection is in or bent out of alinement, said means comprising a rigid collar detachably engaging said hub and formed with an inner rounded surface disposed in engagement with said ridge.

2. In a pipe connection, the combination of a hub and pipe end in telescopic relation and having opposed ground curved engaging surfaces and provided with a packing recess disposed to the rear of and extending laterally in an outward direction from said surfaces, the diameter of the base of said recess being greater than the exterior diameter of the curved surface of the pipe end, and clamping means including a collar contacting constructed and arranged rearwardly of said recess for drawing said surfaces into tight engagement, said collar and pipe having complementary curved engaging portions designed to coöperate with said surfaces whether the connection is in or bent out of alinement.

MARION P. MANN,
*Executrix of Ira A. Mann, deceased.*

Copies of this patent may be obtained for five cents each, by addressing the "Commissioner of Patents, Washington, D. C."